United States Patent
Zhang et al.

(10) Patent No.: US 10,581,784 B2
(45) Date of Patent: Mar. 3, 2020

(54) METHOD AND APPARATUS FOR ADDING NOTIFICATION OBJECTS

(71) Applicant: Alibaba Group Holding Limited, George Town, Grand Cayman (KY)

(72) Inventors: Lili Zhang, Hangzhou (CN); Chunping Zi, Hangzhou (CN); Zhuqing Wan, Hangzhou (CN); Minli Wu, Hangzhou (CN)

(73) Assignee: DingTalk Holding (Cayman) Limited, Grand Cayman (KY)

( * ) Notice: Subject to any disclaimer, the term of this patent is extended or adjusted under 35 U.S.C. 154(b) by 194 days.

(21) Appl. No.: 15/410,977

(22) Filed: Jan. 20, 2017

(65) Prior Publication Data
US 2017/0257338 A1 Sep. 7, 2017

(30) Foreign Application Priority Data
Mar. 7, 2016 (CN) .......................... 2016 1 0128666

(51) Int. Cl.
*H04L 12/58* (2006.01)
*H04L 29/12* (2006.01)

(52) U.S. Cl.
CPC .............. *H04L 51/24* (2013.01); *H04L 51/10* (2013.01); *H04L 51/34* (2013.01); *H04L 51/28* (2013.01); *H04L 61/1594* (2013.01)

(58) Field of Classification Search
CPC ......... H04L 51/24; H04L 51/04; H04L 51/10; H04L 51/34; H04L 12/1895; H04L 51/28;
(Continued)

(56) References Cited

U.S. PATENT DOCUMENTS 6,424,711 B1 7/2002 Bayless
7,035,923 B1 4/2006 Yoakum
(Continued)

FOREIGN PATENT DOCUMENTS

CN 103632332 3/2014
JP 2011517380 6/2011
(Continued)

OTHER PUBLICATIONS

Gwynee, Guilford, "WeChat's little red envelopes are brilliant marketing for mobile payments," published on the internet at https://qz.com, on Jan. 29, 2014 (Year: 2014).

*Primary Examiner* — Tan Doan
(74) *Attorney, Agent, or Firm* — Shun Yao; Park, Vaughan, Fleming & Dowler LLP

(57) ABSTRACT

Embodiments of the present invention provide a system for generating a user-targeting alert notification based on an existing communication message. The system improves significantly over previous systems by providing more efficient and expeditious user operation. A computing device receives an instruction to generate a user-targeting alert notification based on an existing communication message. In response to determining that a body of the existing message indicates a target user in a designated format, the computing device adds the target user as a recipient of the user-targeting alert notification, generates the notification based on the body of the existing communication message, and sends the notification to the recipient.

20 Claims, 13 Drawing Sheets

(58) Field of Classification Search
CPC .. H04L 61/1594; H04L 67/2819; H04L 51/08
USPC .......................................................... 709/206
See application file for complete search history.

(56) References Cited

U.S. PATENT DOCUMENTS

| | | |
|---|---|---|
| 7,133,687 B1 | 11/2006 | El-Fishawy |
| 7,159,191 B2 | 1/2007 | Koivuniemi |
| 7,197,122 B2 | 3/2007 | Vuori |
| 7,398,252 B2 | 7/2008 | Neofytides |
| 7,603,413 B1 | 10/2009 | Herold |
| 7,653,691 B2 | 1/2010 | Lasensky |
| 7,669,134 B1 | 2/2010 | Christie |
| 7,835,955 B1 | 11/2010 | Brodsky |
| 8,165,609 B2 | 4/2012 | Fang |
| 8,316,096 B2 | 11/2012 | Svendsen et al. |
| 8,355,699 B1 | 1/2013 | Lo |
| 8,548,865 B1 | 10/2013 | Ho |
| 8,769,022 B2 | 1/2014 | Tivyan |
| 8,670,791 B2 | 3/2014 | Ye et al. |
| 8,768,310 B1 | 7/2014 | Oroskar |
| 8,788,602 B1 | 7/2014 | Wan |
| 8,843,117 B2 | 9/2014 | Sigmund |
| 8,856,244 B2 | 10/2014 | Madnani |
| 8,880,725 B2 | 11/2014 | Ananthanarayanan |
| 8,968,103 B2 | 3/2015 | Zhou |
| 9,021,040 B1 | 4/2015 | Andrews et al. |
| 9,117,197 B1 | 8/2015 | Sharma |
| 9,143,477 B2 | 9/2015 | Murthy et al. |
| 9,185,062 B1 | 11/2015 | Yang |
| 9,230,244 B2 | 1/2016 | Patil et al. |
| 9,253,639 B1 | 2/2016 | Lafuente |
| 9,800,525 B1 | 10/2017 | Lerner |
| 10,200,332 B2 * | 2/2019 | Wu .......................... G08B 6/00 |
| 2002/0016163 A1 | 2/2002 | Burgan |
| 2002/0120453 A1 | 8/2002 | Lee |
| 2003/0084109 A1 | 5/2003 | Balluff |
| 2003/0135559 A1 | 7/2003 | Bellotti |
| 2003/0154249 A1 | 8/2003 | Crockett |
| 2004/0002932 A1 | 1/2004 | Horvitz |
| 2004/0006599 A1 | 1/2004 | Bates |
| 2004/0085360 A1 | 5/2004 | Pratt |
| 2004/0102962 A1 | 5/2004 | Wei |
| 2005/0149855 A1 * | 7/2005 | Loo ...................... H04M 3/5133 |
| | | 715/255 |
| 2005/0177368 A1 | 8/2005 | Odinak |
| 2006/0093142 A1 | 5/2006 | Schneier |
| 2006/0229890 A1 | 10/2006 | Sattler |
| 2007/0060193 A1 | 3/2007 | Kim |
| 2007/0105572 A1 * | 5/2007 | Kim ........................ H04L 51/24 |
| | | 455/466 |
| 2007/0123223 A1 | 5/2007 | Letourneau |
| 2007/0233801 A1 | 10/2007 | Eren |
| 2007/0299565 A1 | 12/2007 | Oesterling |
| 2008/0112596 A1 | 5/2008 | Rhoads |
| 2008/0114776 A1 | 5/2008 | Sun |
| 2008/0168361 A1 | 7/2008 | Forstall |
| 2008/0168379 A1 | 7/2008 | Forstall |
| 2008/0307040 A1 | 12/2008 | So |
| 2008/0307094 A1 | 12/2008 | Karonen |
| 2009/0018903 A1 | 1/2009 | Iyer |
| 2009/0240497 A1 * | 9/2009 | Usher ..................... H04R 1/10 |
| | | 704/235 |
| 2009/0287776 A1 | 11/2009 | Corry |
| 2010/0005402 A1 | 1/2010 | George |
| 2010/0017481 A1 * | 1/2010 | Chen ................... G06Q 10/107 |
| | | 709/206 |
| 2010/0023341 A1 | 1/2010 | Ledbetter |
| 2010/0056109 A1 | 3/2010 | Wilson |
| 2010/0105362 A1 | 4/2010 | Yang |
| 2010/0205541 A1 | 8/2010 | Rapaport |
| 2010/0323752 A1 | 12/2010 | Park |
| 2011/0019662 A1 | 1/2011 | Katis |
| 2011/0035687 A1 | 2/2011 | Katis |
| 2011/0136431 A1 | 6/2011 | Haaramo |
| 2011/0173041 A1 | 7/2011 | Breitenbach |
| 2011/0173548 A1 | 7/2011 | Madnani |
| 2011/0243113 A1 | 10/2011 | Hjelm |
| 2012/0030301 A1 | 2/2012 | Herold |
| 2012/0059842 A1 | 3/2012 | Hille-Doering |
| 2012/0108268 A1 | 5/2012 | Lau |
| 2012/0185547 A1 | 7/2012 | Hugg |
| 2013/0069969 A1 | 3/2013 | Chang |
| 2013/0080580 A1 | 3/2013 | Nagai |
| 2013/0086071 A1 | 4/2013 | Riedel |
| 2013/0133055 A1 | 5/2013 | Ali |
| 2013/0138726 A1 | 5/2013 | Shin |
| 2013/0144702 A1 | 6/2013 | Tabor |
| 2013/0173723 A1 | 7/2013 | Herold |
| 2013/0227029 A1 * | 8/2013 | Hymel .................. G06Q 10/107 |
| | | 709/206 |
| 2013/0227041 A1 | 8/2013 | Rideout et al. |
| 2013/0268418 A1 | 10/2013 | Sardi |
| 2013/0268765 A1 | 10/2013 | Kent, Jr. |
| 2013/0298006 A1 | 11/2013 | Good |
| 2013/0311920 A1 | 11/2013 | Koo |
| 2013/0332162 A1 | 12/2013 | Keen |
| 2014/0025546 A1 | 1/2014 | Seng |
| 2014/0184544 A1 | 7/2014 | Lim |
| 2014/0191986 A1 | 7/2014 | Kim |
| 2014/0279315 A1 | 9/2014 | Courter |
| 2014/0280615 A1 | 9/2014 | Burlin |
| 2014/0331150 A1 | 11/2014 | Griffin |
| 2014/0372576 A1 | 12/2014 | Watte |
| 2015/0039708 A1 * | 2/2015 | Liu ........................ H04L 51/24 |
| | | 709/206 |
| 2015/0081486 A1 | 3/2015 | Niazi |
| 2015/0170104 A1 | 6/2015 | Yamada |
| 2015/0207926 A1 | 7/2015 | Brown |
| 2015/0256353 A1 | 9/2015 | Busey |
| 2015/0264303 A1 | 9/2015 | Chastney |
| 2015/0296450 A1 | 10/2015 | Koo |
| 2015/0310567 A1 | 10/2015 | Wu |
| 2015/0317590 A1 | 11/2015 | Karlson |
| 2015/0346821 A1 * | 12/2015 | Ichimura ............... G06F 3/0488 |
| | | 345/173 |
| 2015/0350130 A1 | 12/2015 | Yang |
| 2015/0350225 A1 | 12/2015 | Perold |
| 2016/0055215 A1 | 2/2016 | Kauwe |
| 2016/0062574 A1 | 3/2016 | Anzures |
| 2016/0094509 A1 | 3/2016 | Ye |
| 2016/0125363 A1 | 5/2016 | Hung |
| 2016/0132971 A1 | 5/2016 | Teh |
| 2016/0202889 A1 | 7/2016 | Shin |
| 2016/0205049 A1 | 7/2016 | Kim |
| 2016/0227019 A1 | 8/2016 | Seol |
| 2016/0242007 A1 | 8/2016 | Mihara |
| 2016/0330163 A1 | 11/2016 | Le Gall |
| 2017/0041255 A1 | 2/2017 | Dong |
| 2017/0118147 A1 | 4/2017 | Dold |
| 2017/0142212 A1 | 5/2017 | Bifulco |
| 2017/0171135 A1 | 6/2017 | Wu |
| 2017/0185965 A1 | 6/2017 | Nishizawa |
| 2017/0228699 A1 | 8/2017 | Pang |

FOREIGN PATENT DOCUMENTS

| | | |
|---|---|---|
| JP | 2014106592 | 6/2014 |
| JP | 2014115716 | 6/2014 |
| WO | 1999037052 | 7/1999 |
| WO | 2007007330 | 1/2007 |
| WO | 2011117456 | 9/2011 |
| WO | 2014008782 | 1/2014 |
| WO | 2015017029 | 2/2015 |
| WO | 2015113458 | 8/2015 |
| WO | 2016016248 | 2/2016 |
| WO | 2016033581 A1 | 3/2016 |
| WO | 2016050146 | 4/2016 |
| WO | 2016054629 | 4/2016 |

* cited by examiner

METHOD AND APPARATUS FOR ADDING NOTIFICATION OBJECTS

RELATED APPLICATION

Under 35 U.S.C. § 119, this application claims the benefit and right of priority of Chinese Patent Application No. 201610128666.4, filed 7 Mar. 2016.

BACKGROUND

Field

The present application relates to the field of communication technologies, and more specifically, to a method and system for generating a user-targeting alert notification objects based on an existing communication message.

Related Art

In a group-chat scenario involving multiple users, a typical user may receive all communication messages sent by other users in a group conversation. In some cases, a particular communication message may not have a clear target user, or may not be noticed by its intended reader. As a result, some messages may be neglected by users to whom the messages are of interest, or who are expected to pay attention by a sender.

FIG. 1 illustrates an exemplary group chat window 100 with a conversation message indicating a target user in a designated format. As shown, a group "Hard working group" 102 is used as an example, and may include multiple users. That is, besides a user Norton and his associate Ralph, with whom Norton actually wants to have a conversation, the group may include other members, such as their colleague Alice. As shown, Norton initially sends a communication message 104 intended for Ralph, with the content "Ralph, let's have lunch."

Despite Norton's intention, actual cases in common practice may include: 1) Ralph believes that the message is casual chatter among group members, and does not necessarily interest or involve Ralph. Thus, Ralph does not pay attention to the group chat message. 2) Ralph feels there are excessive messages in the group, which interfere with his normal work and learning. Ralph therefore blocks the "Hard working group" altogether, and so cannot normally view a corresponding group chat message. Although Norton addresses Ralph by adding his name to the content of the communication message, unless Ralph carefully reads the message, he will not be sure that he is an intended target user of the message. This may generate misunderstanding, as the message is not effectively conveyed.

Therefore, some systems provide a solution specifically in a group chat scenario. As shown in FIG. 1, the content of Norton's last sent message 106 is, "@RalphC, let's have lunch." Here the text "@RalphC" is information indicating a target user in a designated format, which enables an electronic device to recognize that Ralph (whose username is RalphC) is a target user for the communication message. Thus, the electronic device may send a personal message to Ralph, thereby ameliorating Ralph's blocking or ignoring of "Hard working group."

Apart from this solution in a group chat situation, some systems can generate "forced reminders," i.e., user-targeting alert notifications (also referred to as "Ding" messages) and send them to users, as described in U.S. patent application Ser. No. 15/040,659, hereby incorporated by reference in the present application. A "Ding" message can include text, emoji or other icon, audio, and video messages. The messaging system can also provide a user interface to allow the user to configure the way the "Ding" message is sent.

SUMMARY

One embodiment of the present invention provides a system and method for generating at least one user-targeting alert notification. During operation, the system receives an instruction to generate a user-targeting alert notification based on an existing communication message. The system may then determine that a body of the existing communication message contains information indicating at least one target user in a designated format. The system may then automatically add the at least one target user as a recipient of the user-targeting alert notification. The system may then send the user-targeting alert notification to the recipient.

In a variation on this embodiment, the existing communication message includes a group conversation message to a group, and the at least one target user is a member of the group.

In a variation on this embodiment, the designated format may include a text identifier and a user name. The system may identify the at least one target user by matching the user name in an address book.

In a variation on this embodiment, the system may display the existing communication message in an input control without sending the existing communication message.

In a further variation, displaying the existing communication message in the input control comprises displaying the existing communication message in a non-messaging application.

One embodiment provides a system and method for generating user-targeting alert notifications. During operation, the system receives an instruction to generate a user-targeting alert notification based on an existing communication message. The system may then generate the user-targeting alert notification based on the body of the existing communication message. The system may then send the user-targeting alert notification to a recipient.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention solve the problem of generating a user-targeting alert notification object expeditiously, based on a user indicated in an existing communication message in a designated format. The system improves significantly over previous systems by providing more elegant, efficient, and rapid user operation. The system can generate user-targeting alert notifications (also referred to as "Ding" messages) to a target recipient indicated in the existing communication message body. During operation, the system receives an instruction to generate a user-targeting alert notification based on an existing communication message. The system may then determine that a body of the existing communication message contains information indicating a target user in a designated format. The system can automatically add the target user as a recipient of the user-targeting alert notification, without requiring the sending user to manually designate, input, or select the target recipient. Subsequently, the system can generate the user-targeting alert notification based on the body of the existing communication message, and send the user-targeting alert notification to the recipient.

Figure 2:
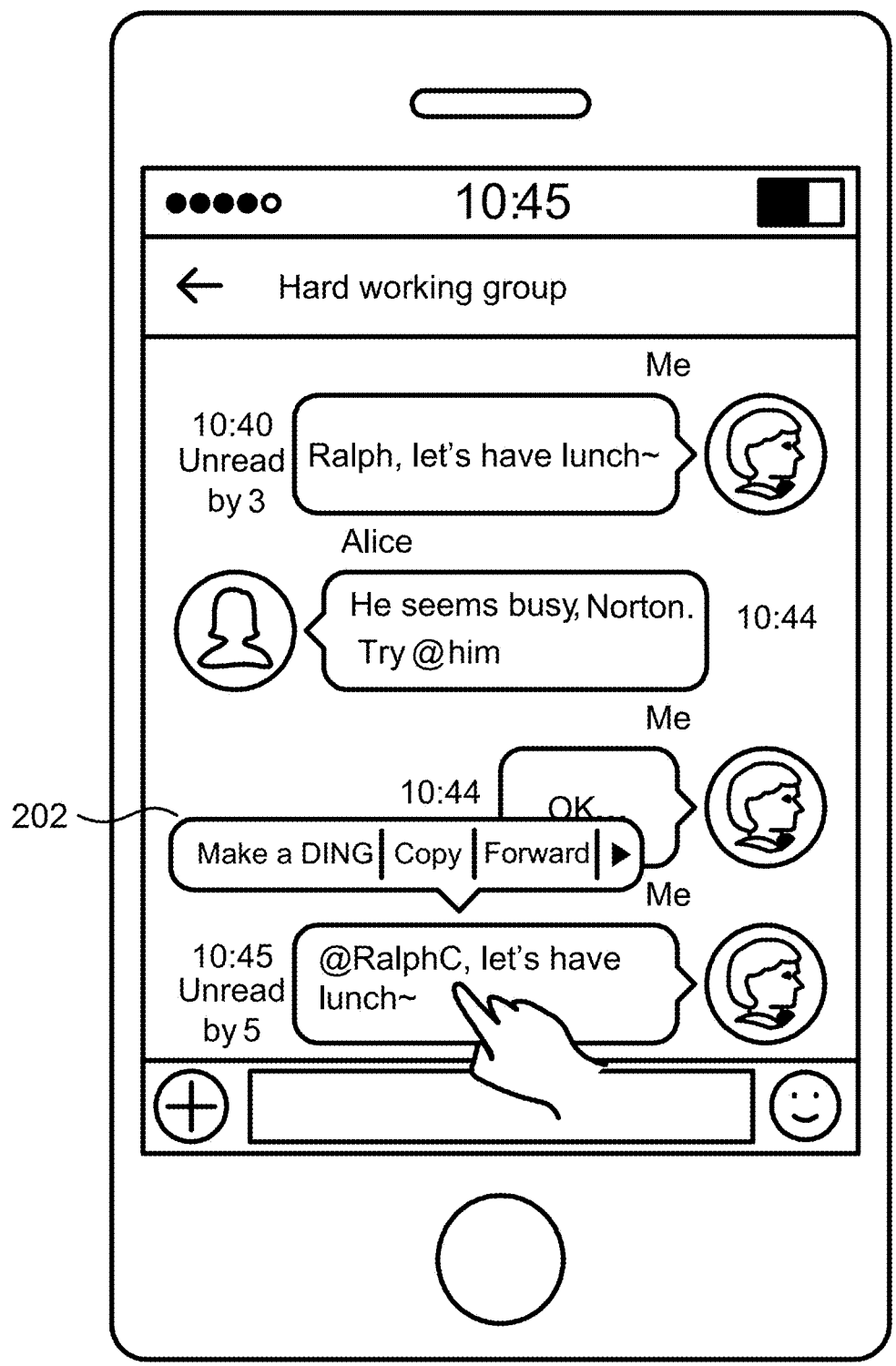
FIG. 2 illustrates generating a user-targeting alert notification based on an existing communication message, according to an embodiment of the present invention.

FIG. 2 illustrates generating a user-targeting alert notification based on an existing communication message, according to an embodiment of the present invention. To ensure that his associate Ralph receives content of a previously sent communication message, the user Norton may trigger a context-sensitive functional option menu corresponding to the sent message. When Norton selects a functional option 202 to generate the alert notification based on the sent message (e.g., "Make a DING" as in FIG. 2), the interface may convert to an alert notification configuration page.

Figure 3:
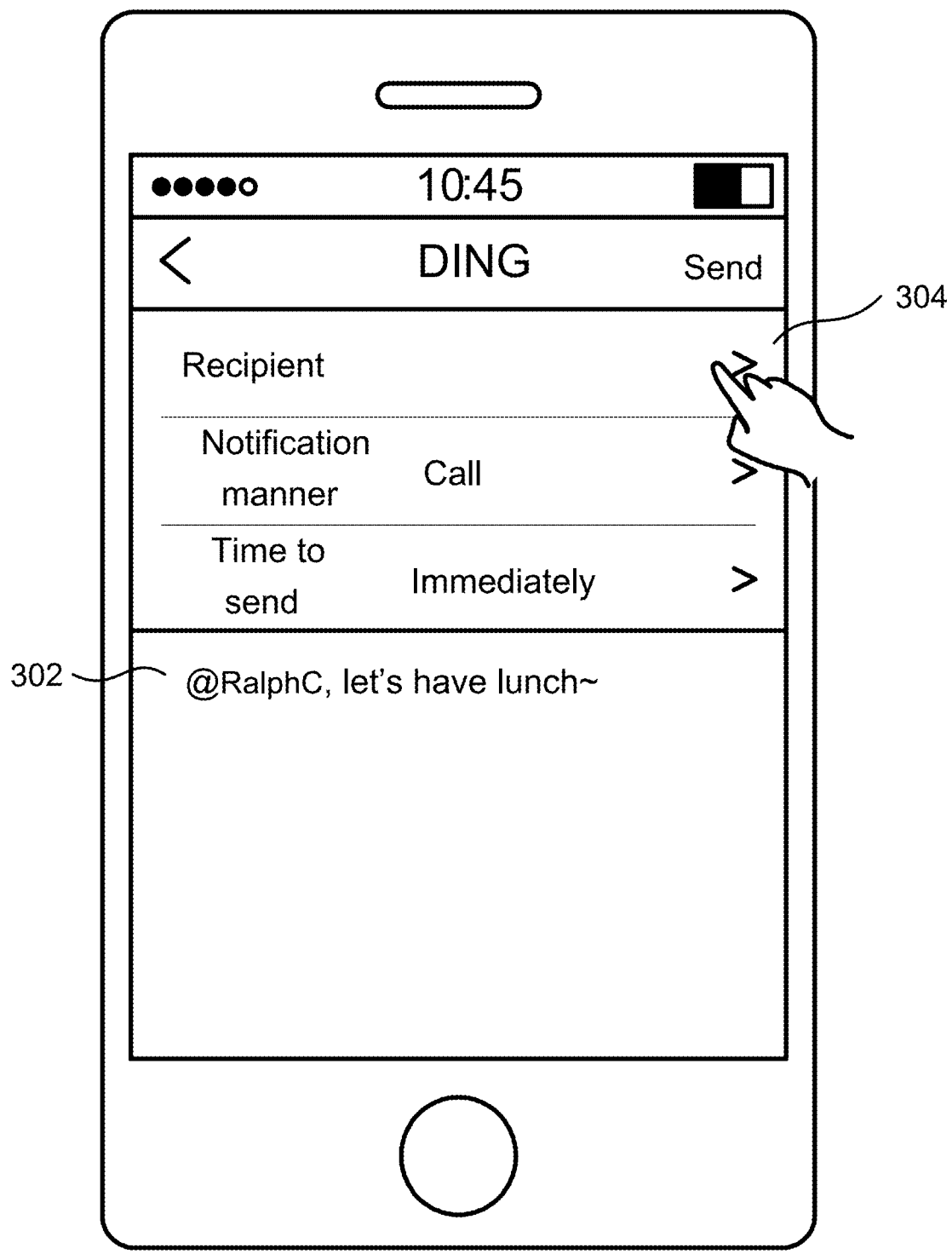
FIG. 3 illustrates configuring a recipient for a user-targeting alert notification.

FIG. 3 illustrates configuring a recipient for a user-targeting alert notification. The content of the sent communication message triggered in FIG. 2 may be directly extracted, and be added automatically as content 302 of the notification message. However, Norton still must choose a recipient manually for the alert notification (operation 304), as shown in FIG. 3.

In fact, as noted above, in the content "@RalphC, let's have lunch," in the body of the sent message, the string "@RalphC" indicates a target username (RalphC) in a designated format (here the target username is designated by the symbol @). Therefore, although Norton may freely choose a recipient of the notification message as in FIG. 3, this operation is often redundant, resulting in unnecessary, complex, and redundant user operations.

The disclosed system and methods improve on the procedure shown in FIG. 3, resolving the necessity for awkward or unwieldy user operations. In some embodiments, when Norton converts the corresponding sent message to a user-targeting alert notification, the system may determine that Ralph (whose username is RalphC) is the actual target user of the alert notification. In some embodiments, Norton may even write the content of the alert notification manually (i.e., rather than generating it from existing content such as a sent message). In such cases, the system may still recognize a target user based on information in a designated format within Norton's alert content that indicates the target user. Additional embodiments of the present invention will be described further below.

Method for Generating a User-Targeting Alert Notification

Figure 4:
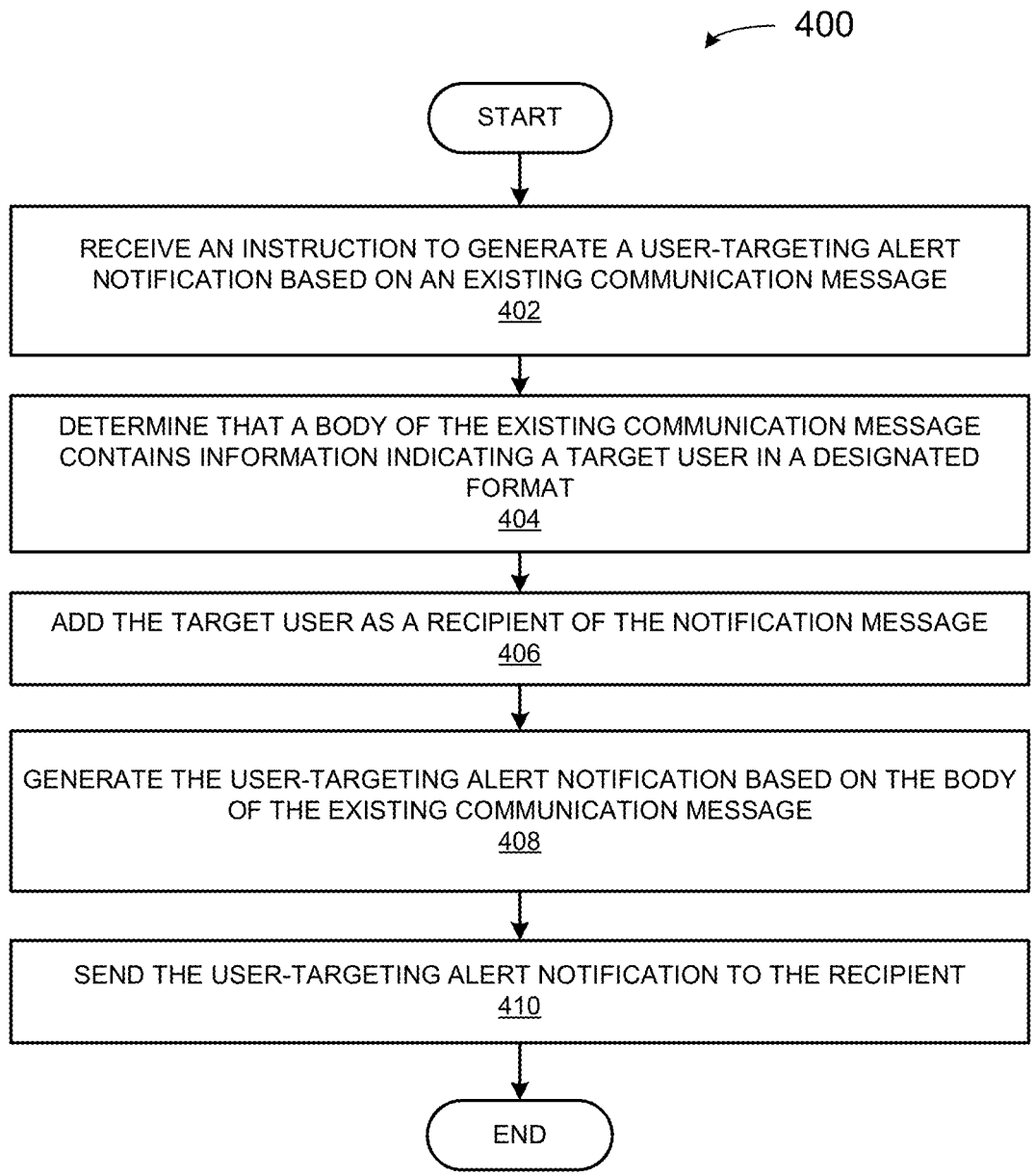
FIG. 4 presents a flowchart illustrating a method for generating a user-targeting alert notification, in accordance with an embodiment of the present invention.

FIG. 4 presents a flowchart illustrating a method 400 for generating a user-targeting alert notification, in accordance with an embodiment of the present invention. In various embodiments, method 400 may be executed by an electronic device, such as a mobile device, or by another computing device or system, for example a server. During operation, the system receives an instruction to generate a user-targeting alert notification based on an existing communication message (operation 402).

The existing communication message content may have any source, which is not limited by the disclosed system and methods. For example, the existing communication message content may be content of a sent message in a conversation presentation window. In some embodiments, the conversation presentation window may be a group conversation window corresponding to an existing group or mailing list of users. In some embodiments, the target user may be at least one of the members of the existing group or mailing list. In some embodiments, the conversation message presentation window may be associated with an instant messaging application, for example, an enterprise instant messaging (EIM) application such as "DING TALK." In some embodiments, the existing message may be an unsent message, or be content entered into a non-messaging application, such as a note or memo.

The system may then determine that a body of the existing communication message contains information indicating a target user in a designated format (operation 404). For example, in some embodiments, the designated format may be the symbol @ followed by a username. The system may then add the target user as a recipient of the user-targeting alert notification (operation 406).

As may be appreciated from the above discussion, the system can recognize information indicating a target user in a designated format in a body of an existing communication message, and may further know or infer a user's intent to send an alert notification to a target user. Therefore, the system may automatically add the target user as a recipient, assisting the user to rapidly compose and specify a recipient of the alert, without requiring the user to manually designate, input, or select the recipient to generate the alert. The system may thereby improve the application experience of the user as well as the application's efficiency and usability.

The system may then generate the user-targeting alert notification based on the body of the existing communication message (operation 408). In some embodiments, in addition to determining recipients of the alert, the system may further add content from the body of the existing communication message as content of the alert notification. The system may then send the user-targeting alert notification to the recipient (operation 410).

Method for Generating a User-Targeting Alert Notification for a Target User

Figure 5:
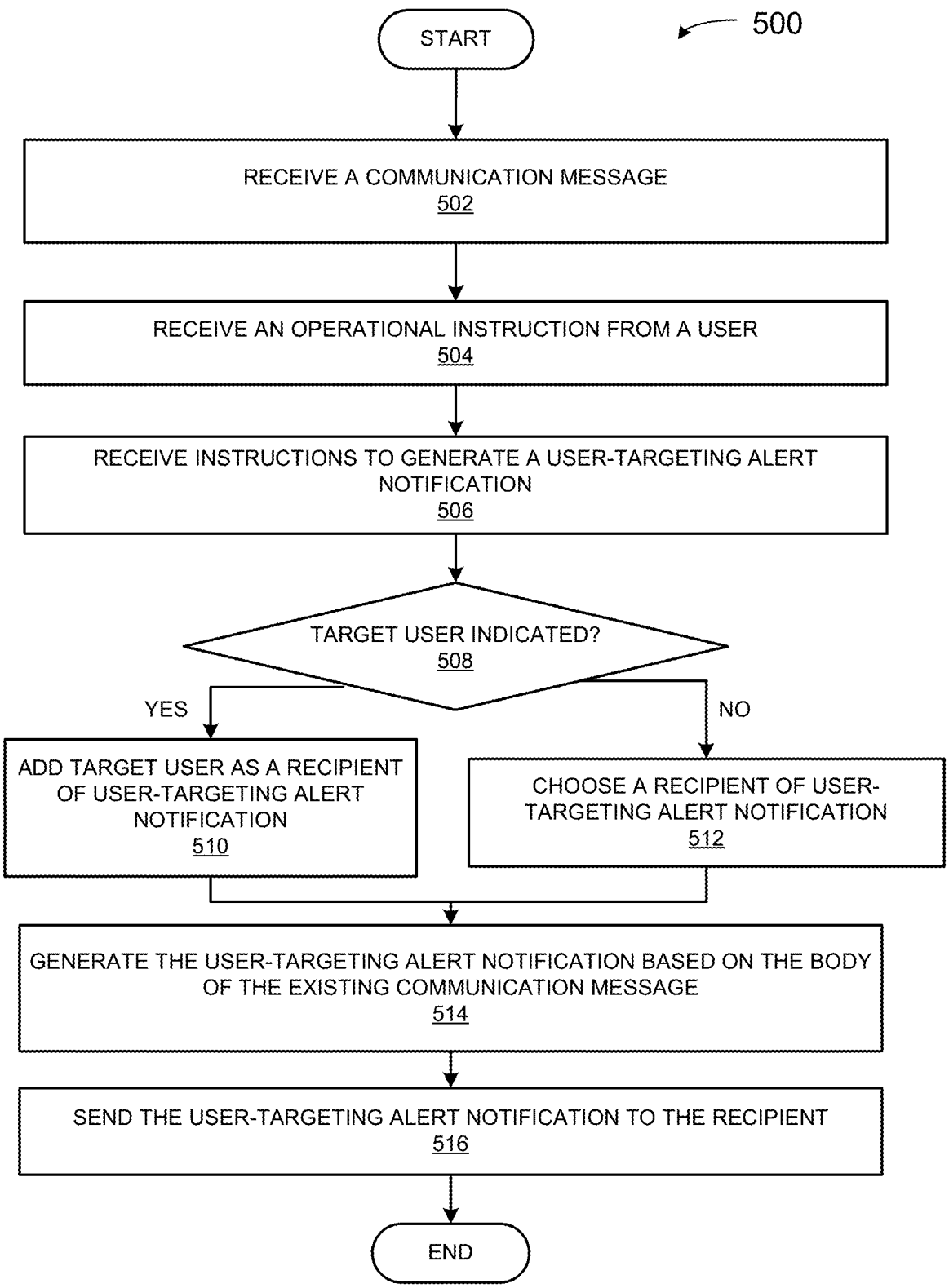
FIG. 5 presents a flowchart illustrating a method for generating a user-targeting alert notification for a target user, in accordance with an embodiment of the present invention.

Here we describe in detail a process in which a user can directly convert an existing communication message into an alert notification (or "DING message") supported by an enterprise instant messaging application, such as "DING TALK." FIG. 5 presents a flowchart illustrating a method for generating a user-targeting alert notification for a target user, in accordance with an embodiment of the present invention. During operation, the system may receive a communication message (operation 502). In this example, Norton and his colleagues, Alice, Ralph, etc., are members of the group "Hard working group." These users can all receive and send group conversation messages using the group conversation message presentation window 100, as described previously.

The system may then receive an operational instruction from a user (operation 504). In some embodiments, the operational instruction may be a trigger operation on an existing or sent communication message. For example, as shown in FIG. 2, when the user taps or long-presses message content "@RalphC, let's have lunch," the system may invoke a menu control 202 that includes functional options such as "Make a DING," "Copy," and "Forward," so that the user can choose a corresponding function.

The system may then receive instructions to generate a user-targeting alert notification (operation 506). For example, as shown in FIG. 2, Norton may choose "Make a DING" in the menu control 202. The system may enable a preset function to generate an alert notification "DING message," in "DING TALK." In some embodiments, the system may convert the existing communication message into the alert notification, e.g., a "DING message."

The system may then determine whether the existing communication message includes information indicating a target user in a designated format (operation 508). In some embodiments, the target user indication information has a known format. For example, the format may be "@+username." Thus, the system may determine "@RalphC" in the sent communication message as the target user indication information. Accordingly, the system can determine that Norton has specified Ralph, among all the group members, as the intended target user of the sent communication message. In some embodiments, other designated formats may be used to indicate the target user, provided the system can distinguish the target indication information from other message content. For example, in some embodiments, another textual symbol such as: or #, or HTML or XML tags or markup such as "mailto:" or "<\user username>", may be used to designate the target username. In some embodiments, the user may designate the target username via a defined operation in the messaging or other application, for example via a trigger operation, drop-down menu, or control.

Figure 6:
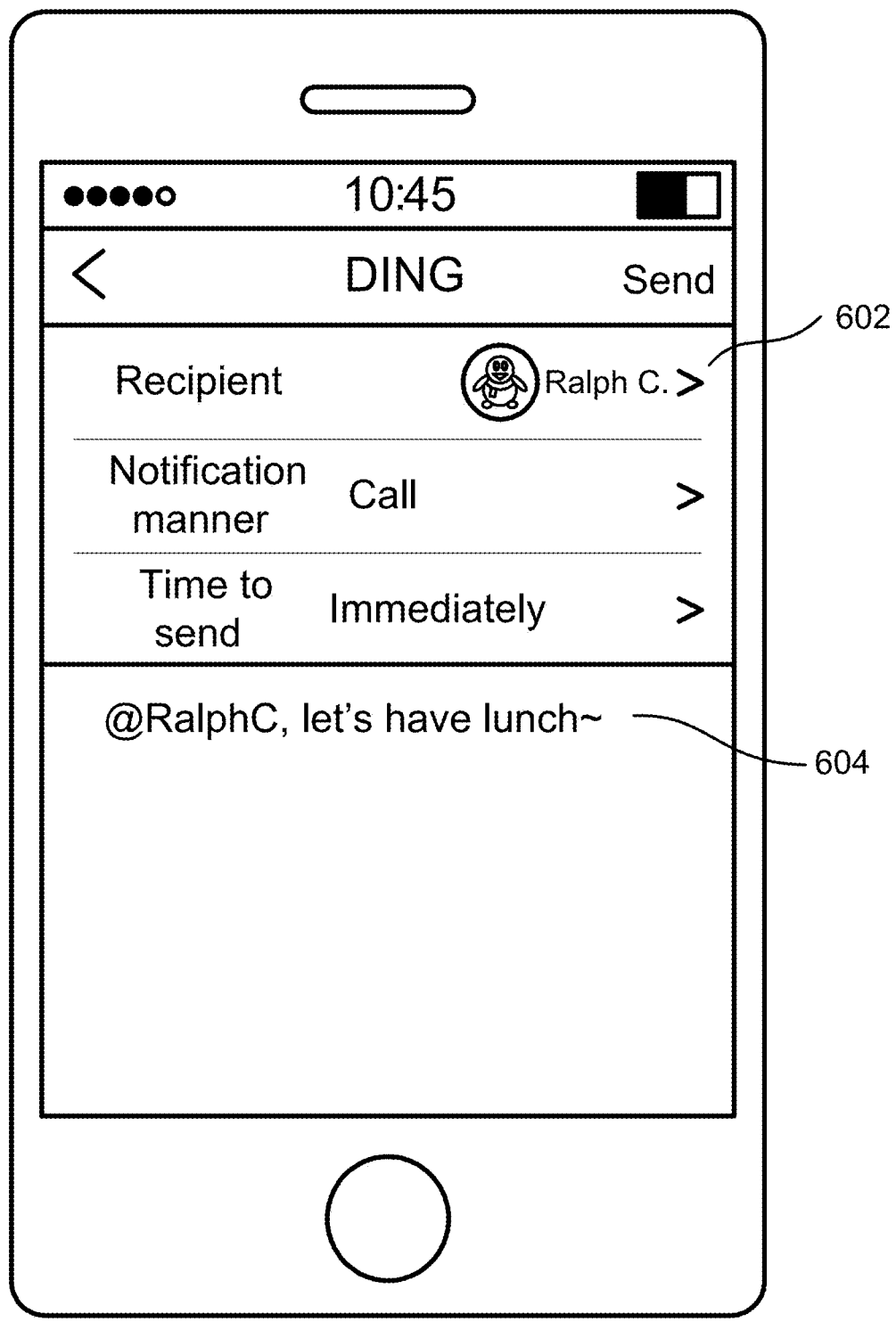
FIG. 6 illustrates an exemplary alert notification generation page with a designated target user, in accordance with an embodiment of the present invention.

Responsive to determining that the existing communication message includes the information indicating a target user, the system may then add the target user as a recipient of the user-targeting alert notification (operation 510). FIG. 6 illustrates an exemplary alert notification generation page with a designated target user, in accordance with an embodiment of the present invention. In some embodiments, when Norton enters target user indication information "@RalphC" in the communication message "@RalphC, let's have lunch," the system determines that Ralph is the intended recipient of the message. In some embodiments, when converting the existing communication message into an alert notification, the system may determine that Ralph remains the likely target user of the alert notification. Therefore, as shown in FIG. 6, the system (e.g., supported by an instant messaging application such as "DING TALK") may automatically add the user Ralph as the recipient 602 of the alert notification. Using the disclosed system and methods, Norton does not need to manually choose a recipient, thereby improving the functionality of communication and messaging systems, and simplifying user operations. In some embodiments, the system still gives Norton the option to edit and configure the recipient of the notification message based on an actual case.

Responsive to determining that the existing communication message does not include the information indicating a target user, the system may instead prompt the user to choose a recipient of the user-targeting alert notification (operation 512). In some embodiments, when the existing communication message does not include the target user information in the designated format, the solution shown in FIG. 3 may be used, i.e. Norton may manually choose a recipient of the notification message. In some embodiments, the system may employ other methods to determine a recipient, e.g., using artificial intelligence or selecting a previous recipient (or a frequent recipient) as the current recipient.

Figure 1:
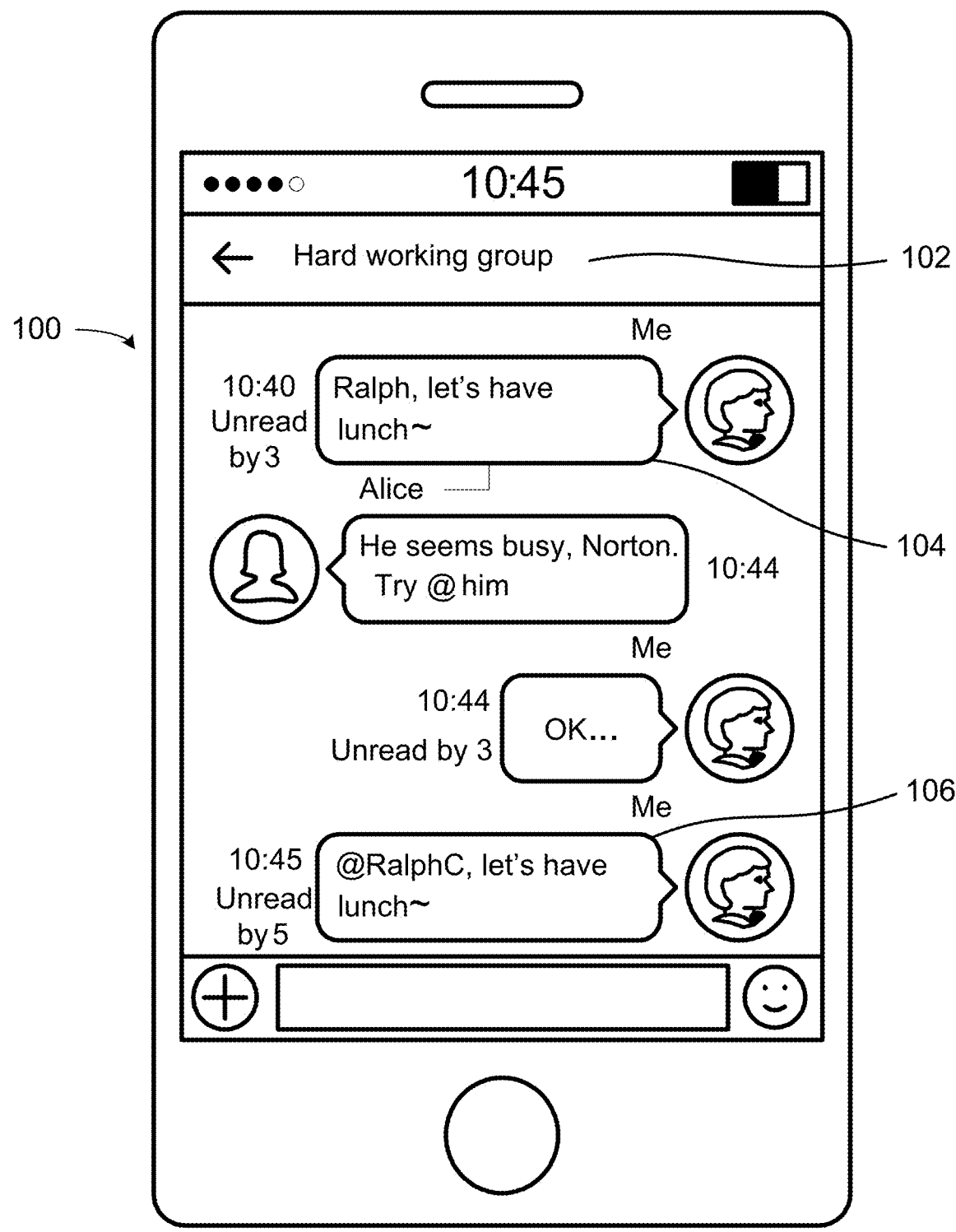
FIG. 1 illustrates an exemplary group chat window with a conversation message indicating a target user in a designated format.

In some embodiments, the system (and/or a supporting messaging application such as "DING TALK") may acquire a read state of the sent communication message by its recipients (e.g., by members of a group conversation). For example, in FIGS. 1, 2, and 3, window 100 shows the read states as "Unread by 3," "Unread by 5," etc. Accordingly, in some embodiments, the system may determine the read state of the existing communication message by its target user (or users), and when the state is "unread," may add the target user as the recipient of the alert notification.

For example, if Ralph's read state of the user is "unread," the system can automatically add Ralph as the recipient of the alert notification. If, however, Ralph's read state is "read," this indicates that Ralph already knows the corresponding message content, so in some embodiments, the system may not add Ralph as the recipient. In some embodiments, instead, Norton may manually select a recipient.

In some embodiments, the system may determine the read state, regardless of whether the message contains target user information in the designated format. For example, even if Norton manually designates Ralph as the target recipient of an alert notification or "DING" based on an existing message, the system may determine whether Ralph has read the existing message when adding him as a recipient of the alert. Of course, in some embodiments, the system may add the recipient without determining the read state, or this determination may be overridden, e.g., by a user option.

The system may then generate the user-targeting alert notification based on the body of the existing communication message (operation 514). In some embodiments, aside from using an existing message to determine recipients, the system can add content from the body of the existing communication message as content of the alert notification. In some embodiments, the system may directly add content from the sent communication message (for example, "@RalphC, let's have lunch") as content 604 of the alert notification, so that the user need not enter such content manually. Of course, in some embodiments, the user may edit this content, as shown in FIG. 6, or clear the content or disable automatic addition of content. Finally, the system may send the user-targeting alert notification to the recipient (operation 516).

Designating Multiple Target Users

Figure 7:
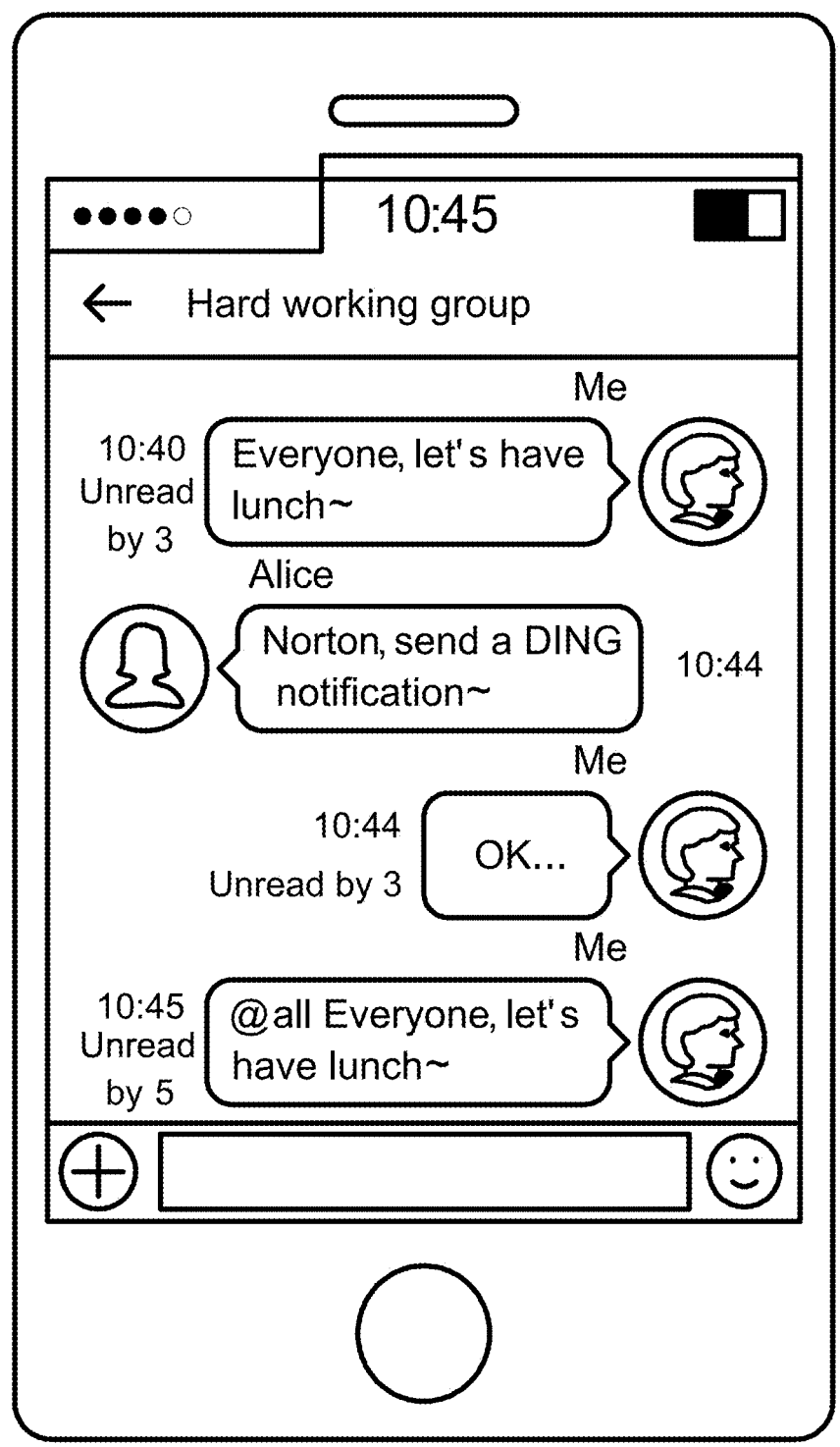
FIG. 7 illustrates an exemplary group chat conversation message indicating multiple target users in a designated format, in accordance with an embodiment of the present invention.
Figure 8:
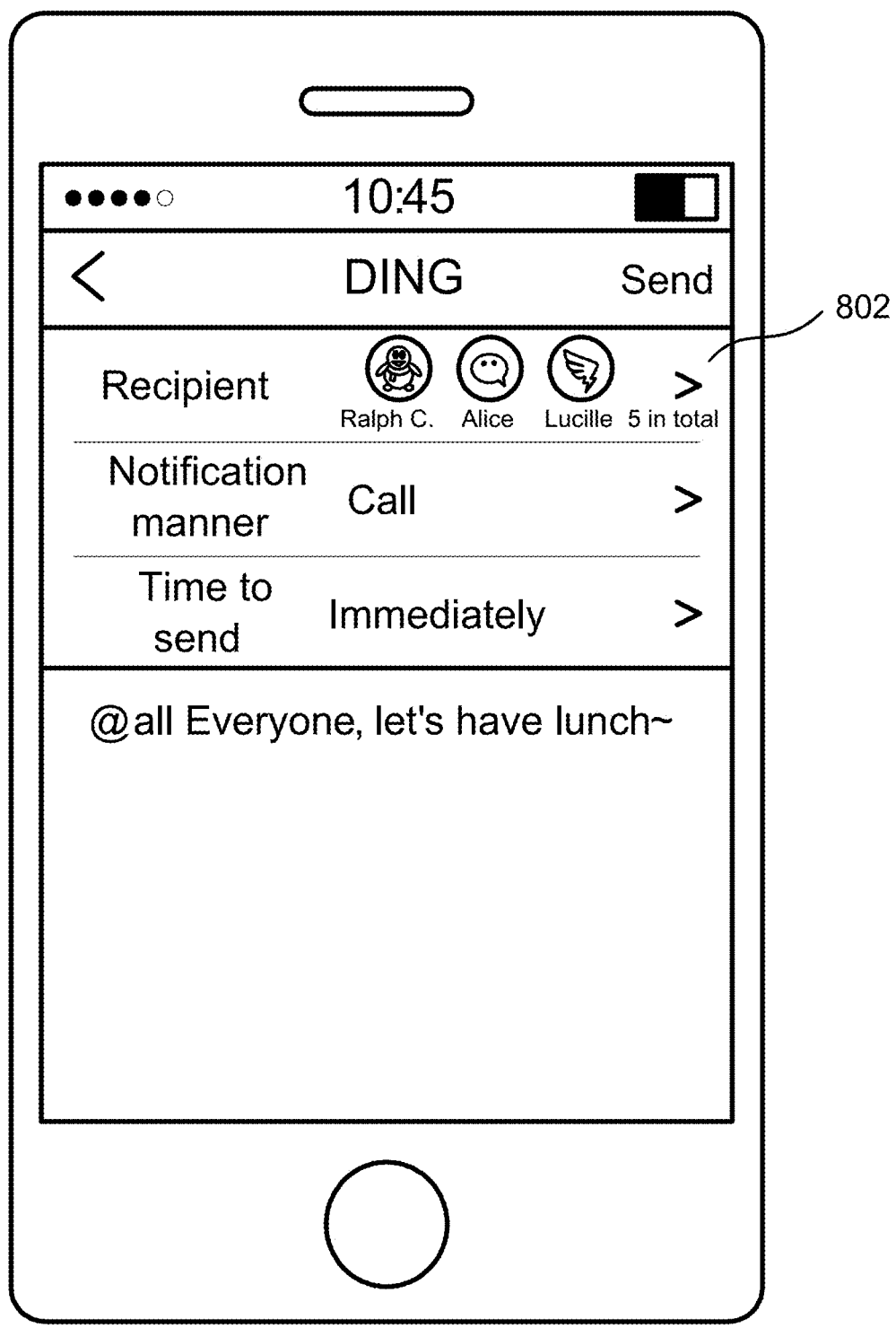
FIG. 8 illustrates an exemplary alert notification generation page with multiple designated target users, in accordance with an embodiment of the present invention.

In the previous examples, only a single target user, i.e. Ralph, is indicated by the information in a designated format. However, in some embodiments, the system can generate alert notifications based on target user indication information corresponding to multiple users. FIG. 7 illustrates an exemplary group chat conversation message indicating multiple target users in a designated format, in accordance with an embodiment of the present invention. For example, Norton can generate an alert notification based on the existing message content, "@all Everyone, let's have lunch~." The target user indication information "@all" corresponds to all members in the group conversation (e.g., all members of the "Hard working group"). FIG. 8 illustrates an exemplary alert notification generation page with multiple designated target users, in accordance with an embodiment of the present invention. Thus, when generating the alert notification, the system may simultaneously add multiple members of the group as recipients 802, as shown in FIG. 8.

In some embodiments, the system may also determine multiple recipients of the alert notification simultaneously, based on the corresponding indicated users' read states for the existing message. For example, as shown in FIG. 7, the content of the existing sent message has a read state of "unread by 5." Therefore, although the target user indication information "@all" corresponds to all members of the "Hard working group," the system may only add as recipients 802 the five "unread" users, i.e., Ralph, Alice, Lucille, etc. In some embodiments, Norton may manually add other users.

Generating Alert Notifications from a Variety of Message Sources

The disclosed system and methods are not limited to previously sent messages, but are applicable to message content from any source, including from unsent messages or even from non-messaging applications. As long as the content includes target user indication information (e.g., "@RalphC"), the system may automatically add recipients of an alert notification using the disclosed system and methods.

Figure 9:
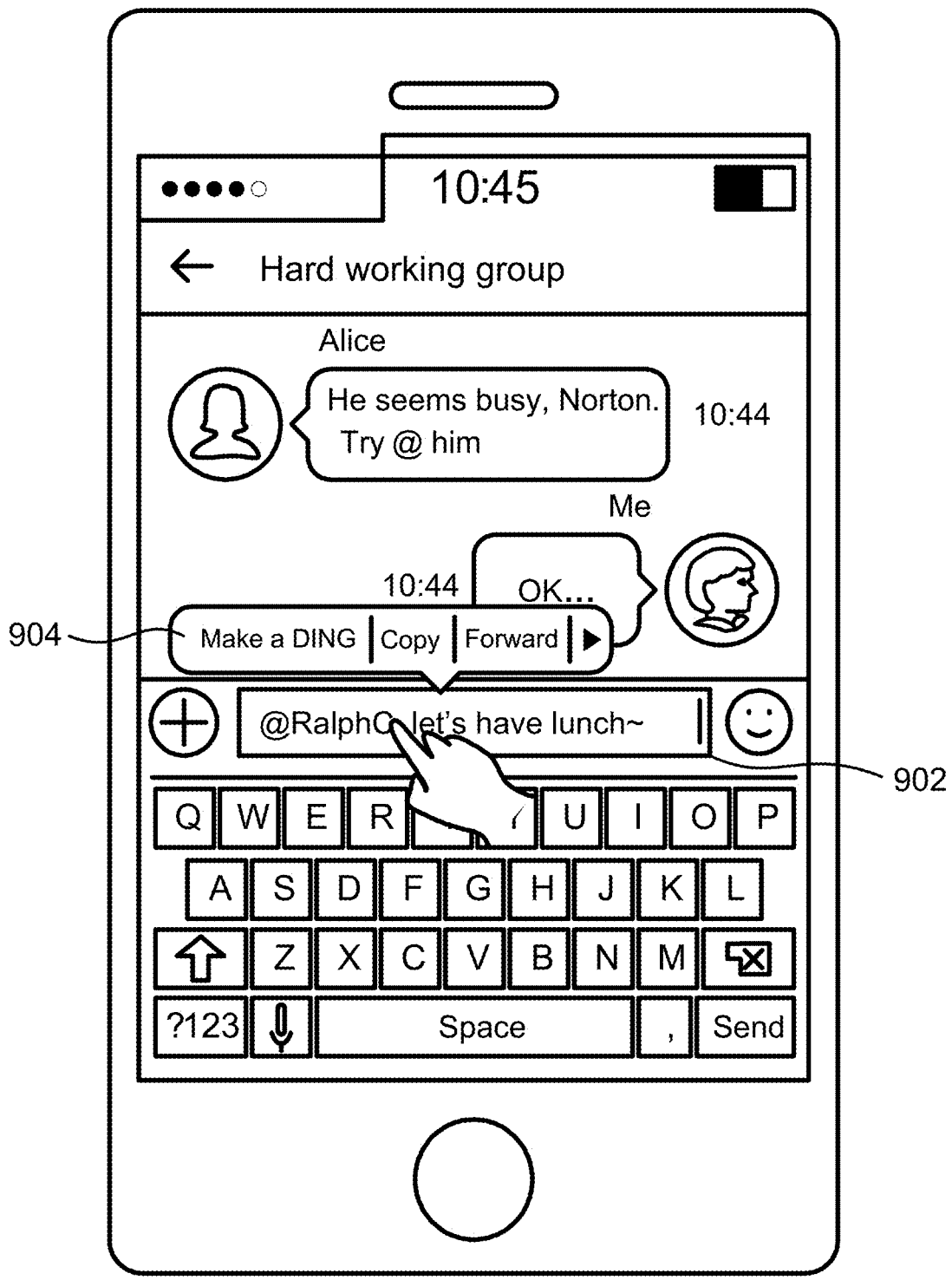
FIG. 9 illustrates generating a user-targeting alert notification from an unsent existing communication message displayed in an input control, in accordance with an embodiment of the present invention.

FIG. 9 illustrates generating a user-targeting alert notification from an unsent existing communication message displayed in an input control, in accordance with an embodiment of the present invention. For example, by tapping, long-pressing, or triggering input box 902 as shown in FIG. 9, the user may invoke corresponding menu box 904. When the user chooses "Make a DING" from menu 904, the interface may convert to an alert notification configuration page such as the one shown in FIG. 6. The system may then generate a user-targeting alert notification, in accordance with embodiments of the present invention.

Figure 10:
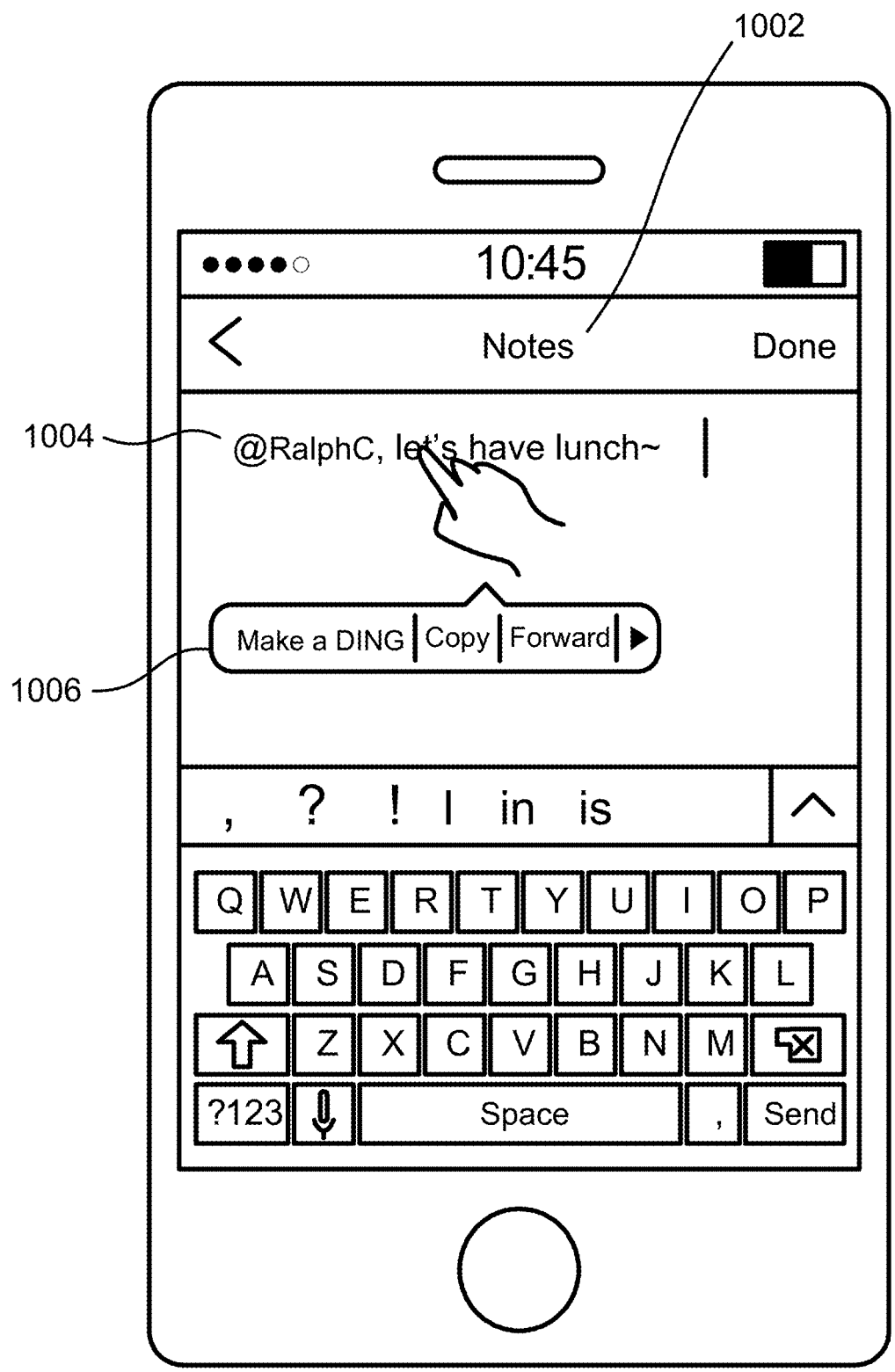
FIG. 10 illustrates generating an alert notification from an existing message displayed in an input control in a non-messaging application, in accordance with an embodiment of the present invention.

In some embodiments, the existing message content need not originate in a conversation or messaging window. FIG. 10 illustrates generating an alert notification from an existing message displayed in an input control in a non-messaging application 1002, in accordance with an embodiment of the present invention. As shown in FIG. 10, Norton has entered the content "@RalphC, let's have lunch~" 1004 in the non-messaging application "Notes" 1002. In some embodiments, as long as content 1004 includes target user indication information such as "@RalphC," the system may recognize content 1004 as a potential source for an alert notification, even if content 1004 does not originate within a message. Thus, when Norton taps, long-presses, or otherwise triggers entered content 1004, the system may invoke corresponding menu box 1006. When Norton chooses "Make a DING" from menu 1006, the system may convert the interface to an alert message configuration page and generate a user-targeting alert notification, in accordance with embodiments of the present invention.

In some embodiments, non-messaging application 1002 (e.g., "Notes" as in FIG. 10) may be an applet, script, or application function, which may execute within an enterprise instant messaging application or suite, such as "DING TALK." In some embodiments, non-messaging application 1002 may be an independent application program installed on an electronic device. In some embodiments, application 1002 may communicate with a separate enterprise messaging application or suite, such as "DING TALK," or give the separate messaging application permission to share data, coordinate, or interwork with application 1002.

Apparatus and Electronic Device

Figure 11:
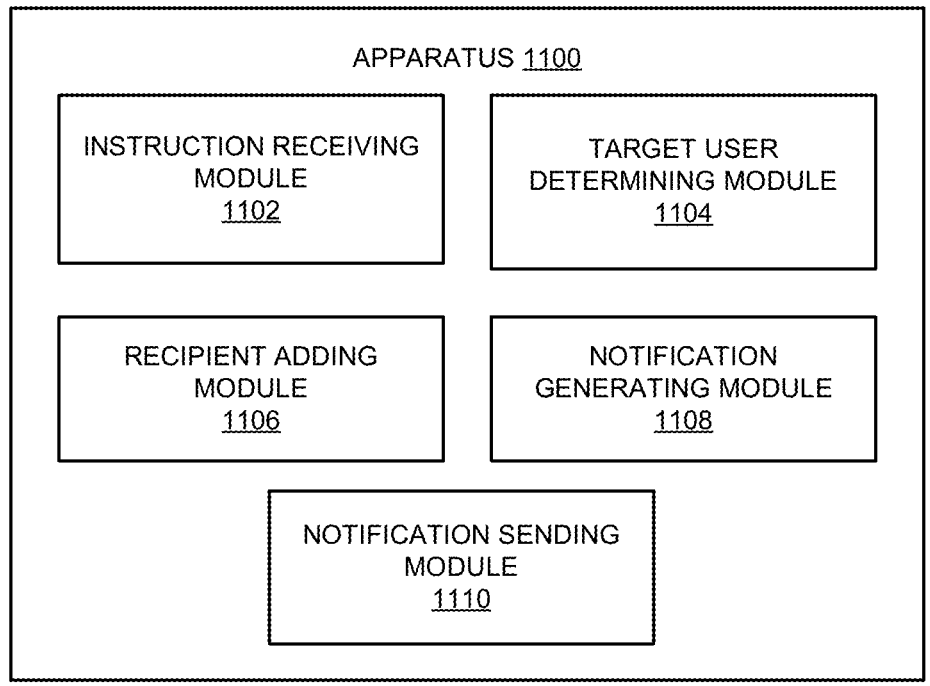
FIG. 11 presents a block diagram illustrating an exemplary apparatus for generating user-targeting alert notifications, in accordance with an embodiment of the present invention.

FIG. 11 presents a block diagram illustrating an exemplary apparatus for generating user-targeting alert notifications, in accordance with an embodiment of the present invention. Apparatus 1100 can comprise a plurality of modules which may communicate with one another via a wired or wireless communication channel. Apparatus 1100 may be realized using one or more integrated circuits, and may include fewer or more modules than those shown in FIG. 11. Further, apparatus 1100 may be integrated in a computer system, or realized as a separate device which is capable of communicating with other computer systems and/or devices. Specifically, apparatus 1100 can comprise an instruction receiving module 1102, a target user determining module 1104, a recipient adding module 1106, a notification generating module 1108, and a notification sending module 1110. Note that apparatus 1100 may also include additional modules not depicted in FIG. 11.

In some embodiments, instruction receiving module 1102 can obtain instructions to generate a user-targeting alert notification. Target user determining module 1104 may determine a target user based on information in the existing communication message. Recipient adding module 1106 may add the target user as a recipient of the alert. Notification generating module 1108 may generate a user-targeting alert notification. Notification sending module 1110 may send the user-targeting alert notification.

Figure 12:
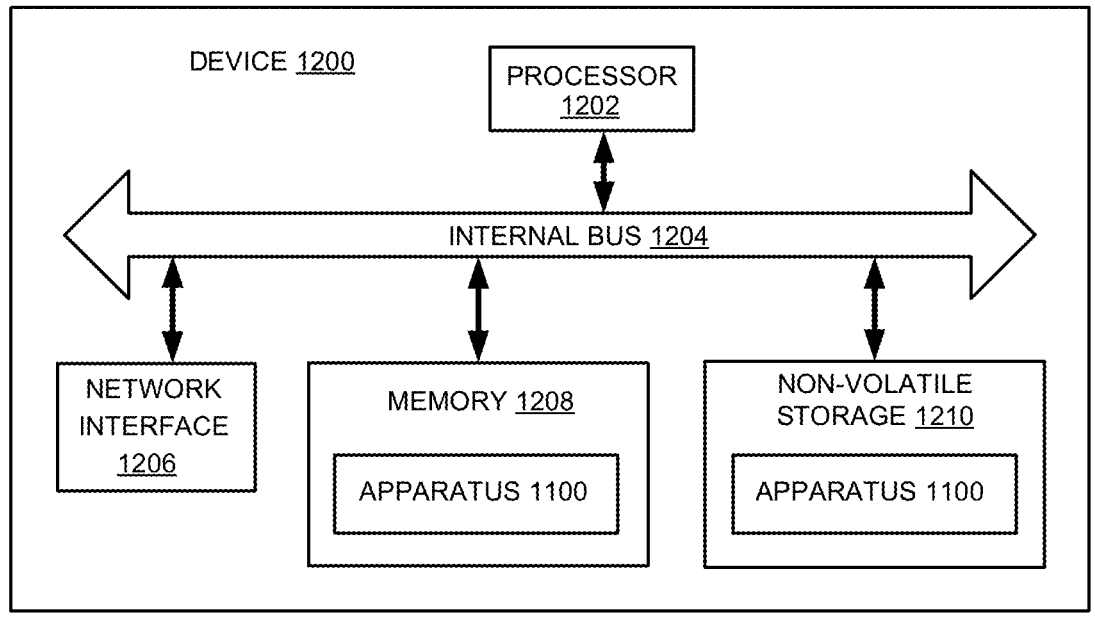
FIG. 12 presents a block diagram illustrating an exemplary device for generating user-targeting alert notifications, in accordance with an embodiment of the present invention.

FIG. 12 presents a block diagram illustrating an exemplary device for generating user-targeting alert notifications, in accordance with an embodiment of the present invention. Referring to FIG. 12, electronic device 1200 may include hardware such as a processor 1202, an internal bus 1204, a network interface 1206, memory 1208, and a non-volatile storage device 1210. In some embodiments, electronic device 1200 may also include additional hardware. Processor 1202 may read a corresponding computer program from non-volatile storage device 1210 into memory 1208 and may run the computer program, so as to form, on a logic level, an apparatus such as 1100 for generating user-targeting alert notifications. In some embodiments, the disclosed system may also be implemented as a logic device or as a combination of software and hardware.

Computer and Communication System

Figure 13:
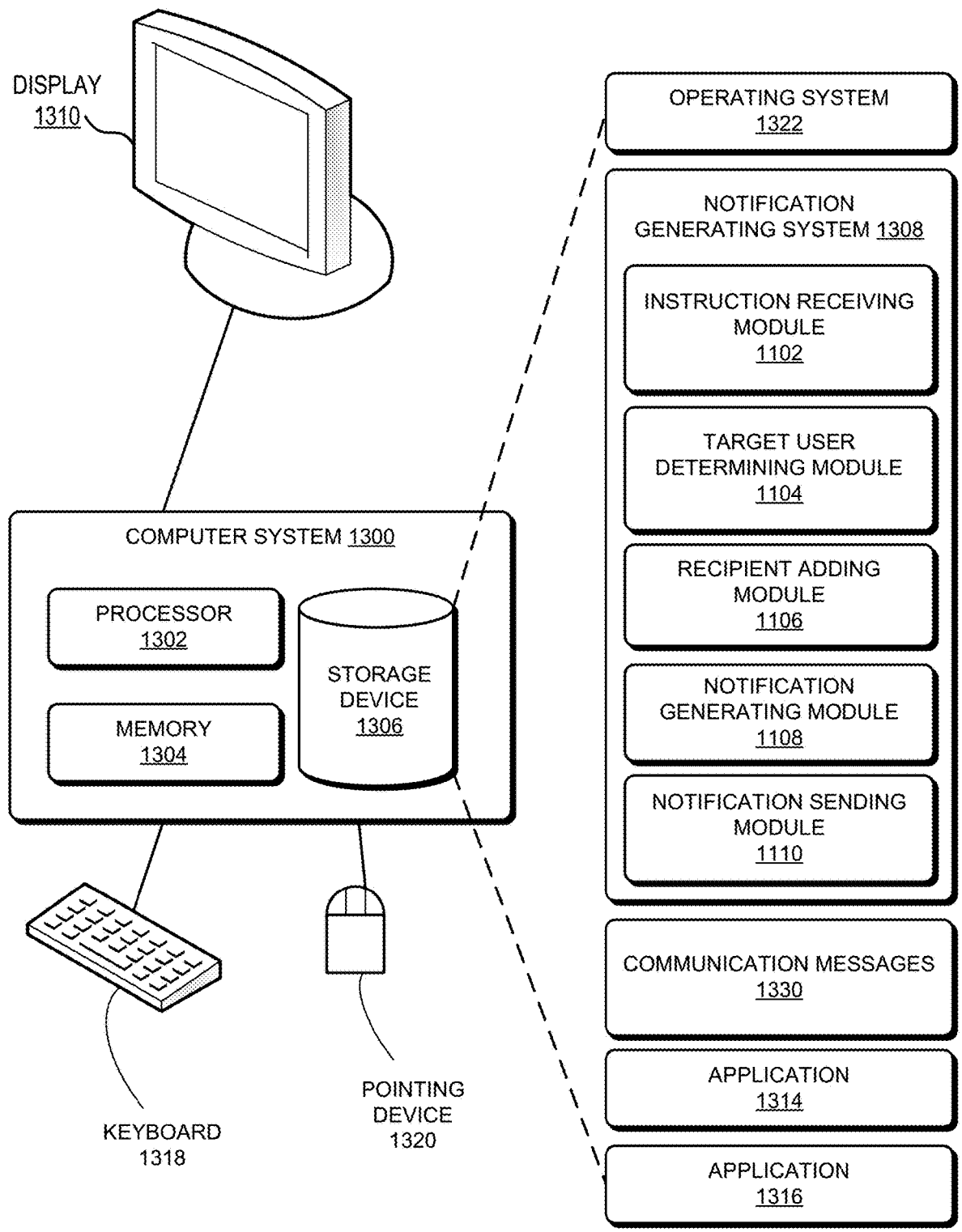
FIG. 13 presents a block diagram illustrating an exemplary computer system for generating user-targeting alert notifications, in accordance with an embodiment of the present invention.

FIG. 13 presents a block diagram illustrating an exemplary computer system for generating user-targeting alert notifications, in accordance with an embodiment of the present invention. In FIG. 13, system 1300 includes a processor 1302, a memory 1304, and a storage 1306. Storage 1306 typically stores instructions that can be loaded into memory 1304 and executed by processor 1302 to perform the methods mentioned above. As a result, system 1300 can perform the functions described above.

In one embodiment, the instructions in storage 1306 can implement an instruction receiving module 1102, a target user determining module 1104, a recipient adding module 1106, a notification generating module 1108, and a notification sending module 1110.

Instruction receiving module 1102 can obtain instructions to generate a user-targeting alert notification. Target user determining module 1104 may determine a target user based on information in the existing communication message. Recipient adding module 1106 may add the target user as a recipient of the alert. Notification generating module 1108 may generate a user-targeting alert notification. Notification sending module 1110 may send the user-targeting alert notification.

In some embodiments, modules 1102, 1104, 1106, 1108, and 1110 can be partially or entirely implemented in hardware and can be part of processor 1302. Further, in some embodiments, the system may not include a separate processor and memory. Instead, in addition to performing their specific tasks, modules 1102, 1104, 1106, 1108, and 1110, either separately or in concert, may be part of general- or special-purpose computation engines.

System 1300 can be coupled to an optional display 1310 (which can be a touchscreen display), keyboard 1318, and pointing device 1320, and can also be coupled via one or more network interfaces 1206 to one or more networks.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 14:
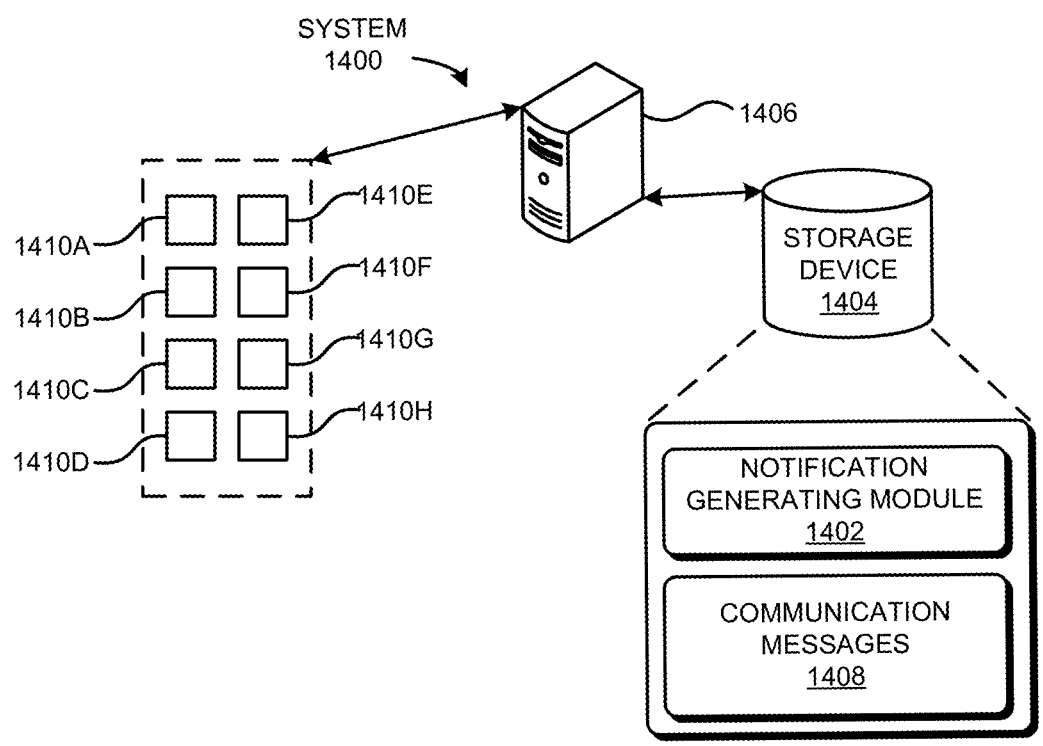
FIG. 14 presents a block diagram illustrating an exemplary user-targeting alert notification generation system utilizing the alert notification generating method, according to embodiments of the present invention.

FIG. 14 presents a block diagram illustrating an exemplary user-targeting alert notification generation system utilizing the alert notification generating method, according to embodiments of the present invention. User-targeting alert notification generation system 1400 may include a notification generating module 1402 installed on a storage device 1404 coupled to a server 1406. Note that various implementations of the present invention may include any number of computers, servers, and storage devices. In various implementations, notification generating module 1402 may include a target user determining module or other components of user-targeting alert notification generation system 1400 to perform the techniques described herein. System 1400 may receive data describing communication messages and/or target users, and store such data in storage device 1404. System 1400 may read the code for notification generating module 1402 and the data for communication messages 1408 from storage device 1404. System 1400 may divide alert notification, communication message, and/or target user data, and assign them to processors, such as processors 1410A-1410H, which may operate on the assigned alert notifications, communication messages, and/or target users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executed method for generating at least one user-targeting alert notification, the method comprising:
   determining, by a computing device associated with a user, an existing communication message displayed on the computing device;
   receiving, from the user via the computing device, a first instruction to invoke a menu control which includes a function to generate a user-targeting alert notification;
   invoking, by the computing device, the menu control, wherein the menu control is displayed on the computing device; and
   in response to receiving, from the user, a second instruction which invokes the function to generate the user-targeting alert notification based on the existing communication message, converting the existing communication message to the user-targeting alert notification, which involves:
   determining that a body of the existing communication message contains information indicating at least one target user in a designated format;
   automatically adding, by the computing device, the at least one target user as a recipient of the user-targeting alert notification;
   displaying, on the computing device, a graphical user interface which indicates the automatically added at least one target user; and
   sending the user-targeting alert notification to the recipient.

2. The method of claim 1,
   wherein the existing communication message includes a group conversation message to a group, and wherein the at least one target user is a member of the group;

wherein the designated format includes a text identifier and a user name; and
wherein the method further comprises identifying the at least one target user by matching the user name in an address book.

3. The method of claim 1:
wherein the displayed graphical user interface further allows the user to manually select one or more target users as recipients of the user-targeting alert notification, and
wherein sending the user-targeting alert notification to the recipient further comprises sending the user-targeting alert notification to the manually selected recipients.

4. The method of claim 1, further comprising determining the recipient of the user-targeting alert notification based on one or more of:
a read status of the existing communication message;
artificial intelligence;
selecting as the recipient a target user who has previously received a user-targeting alert notification; and
selecting as the recipient a target user who has frequently received user targeting alert notifications.

5. The method of claim 1, further comprising displaying the existing communication message in an input control without sending the existing communication message.

6. The method of claim 5, wherein displaying the existing communication message in the input control comprises displaying the existing communication message in a non-messaging application.

7. The method of claim 1, wherein the generated user-targeting alert notification includes one or more of:
a text message;
an emoji;
an audio message delivered via a voice call; and
a video message.

8. A non-transitory computer-readable storage medium storing instructions that when executed by a computer cause the computer to perform a method for generating at least one user-targeting alert notification, the method comprising:
determining, by a computing device associated with a user, an existing communication message displayed on the computing device;
receiving, from the user via the computing device, a first instruction to invoke a menu control which includes a function to generate a user-targeting alert notification;
invoking, by the computing device, the menu control, wherein the menu control is displayed on the computing device; and
in response to receiving, from the user, a second instruction which invokes the function to generate the user-targeting alert notification based on the existing communication message, converting the existing communication message to the user-targeting alert notification, which involves:
determining that a body of the existing communication message contains information indicating at least one target user in a designated format;
automatically adding, by the computing device, the at least one target user as a recipient of the user-targeting alert notification;
displaying, on the computing device, a graphical user interface which indicates the automatically added at least one target user; and
sending the user-targeting alert notification to the recipient.

9. The non-transitory computer-readable storage medium of claim 8,
wherein the existing communication message includes a group conversation message to a group, and wherein the at least one target user is a member of the group;
wherein the designated format includes a text identifier and a user name; and
wherein the method further comprises identifying the at least one target user by matching the user name in an address book.

10. The non-transitory computer-readable storage medium of claim 8:
wherein the displayed graphical user interface further allows the user to manually select one or more target users as recipients of the user-targeting alert notification, and
wherein sending the user-targeting alert notification to the recipient further comprises sending the user-targeting alert notification to the manually selected recipients.

11. The non-transitory computer-readable storage medium of claim 8, wherein the method further comprises determining the recipient of the user-targeting alert notification based on one or more of:
a read status of the existing communication message;
artificial intelligence;
selecting as the recipient a target user who has previously received a user-targeting alert notification; and
selecting as the recipient a target user who has frequently received user targeting alert notifications.

12. The non-transitory computer-readable storage medium of claim 8, wherein the method further comprises displaying the existing communication message in an input control without sending the existing communication message.

13. The non-transitory computer-readable storage medium of claim 12, wherein the existing communication message has been entered in the input control in a non-messaging application.

14. The non-transitory computer-readable storage medium of claim 8, wherein the generated user-targeting alert notification includes one or more of:
a text message;
an emoji;
an audio message delivered via a voice call; and
a video message.

15. A computing system for generating at least one user-targeting alert notification, the system comprising:
a set of processors; and
a non-transitory computer-readable medium coupled to the set of processors storing instructions thereon that, when executed by the processors, cause the processors to perform a method for generating user-targeting alert notifications, the method comprising:
determining, by a computing device associated with a user, an existing communication message displayed on the computing device;
receiving, from the user via the computing device, a first instruction to invoke a menu control which includes a function to generate a user-targeting alert notification;
invoking, by the computing device, the menu control, wherein the menu control is displayed on the computing device; and
in response to receiving, from the user, a second instruction which invokes the function to generate the user-targeting alert notification based on the existing communication message, converting the existing communication message to the user-targeting alert notification, which involves:

determining that a body of the existing communication message contains information indicating at least one target user in a designated format;

automatically adding, by the computing device, the at least one target user as a recipient of the user-targeting alert notification;

displaying, on the computing device, a graphical user interface which indicates the automatically added at least one target user; and sending the user-targeting alert notification to the recipient.

16. The computing system of claim 15, wherein the existing communication message includes a group conversation message to a group, and wherein the at least one target user is a member of the group;

wherein the designated format includes a text identifier and a user name; and wherein the method further comprises identifying the at least one target user by matching the user name in an address book.

17. The computing system of claim 15:

wherein the displayed graphical user interface further allows the user to manually select one or more target users as recipients of the user-targeting alert notification, and wherein sending the user-targeting alert notification to the recipient further comprises sending the user-targeting alert notification to the manually selected recipients.

18. The computing system of claim 15, wherein the method further comprises determining the recipient of the user-targeting alert notification based on one or more of:

a read status of the existing communication message;

artificial intelligence;

selecting as the recipient a target user who has previously received a user-targeting alert notification; and selecting as the recipient a target user who has frequently received user targeting alert notifications.

19. The computing system of claim 15, wherein the existing communication message has been entered in an input control but not sent.

20. The computing system of claim 19, wherein the existing communication message has been entered in the input control in a non-messaging application.

* * * * *